April 26, 1966 A. GILBERT 3,247,700
FORGING MANIPULATOR

Filed July 11, 1963 4 Sheets-Sheet 1

INVENTOR.
Alex Gilbert
BY Webb, Mackey & Burden
HIS ATTORNEYS

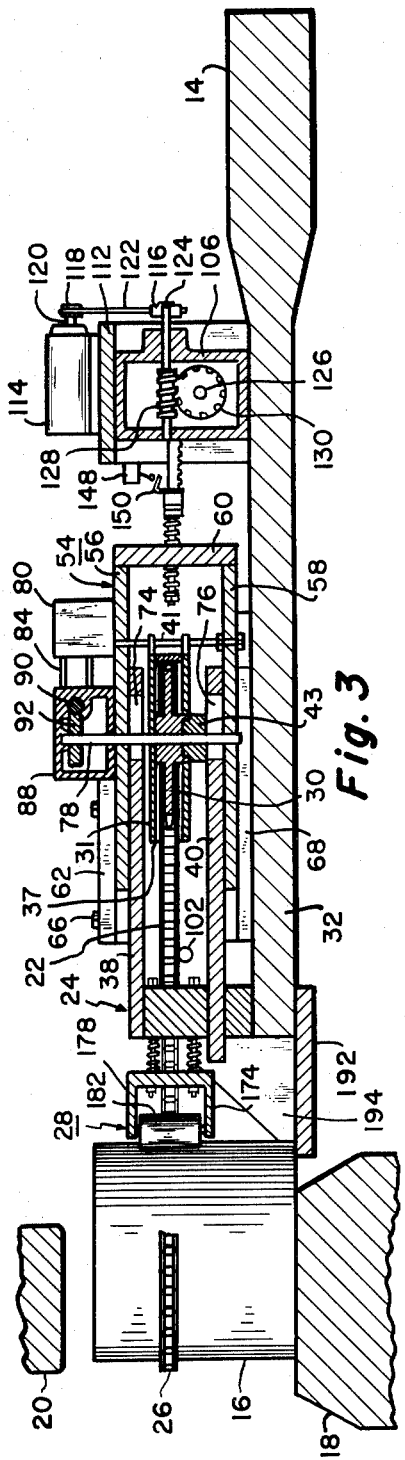
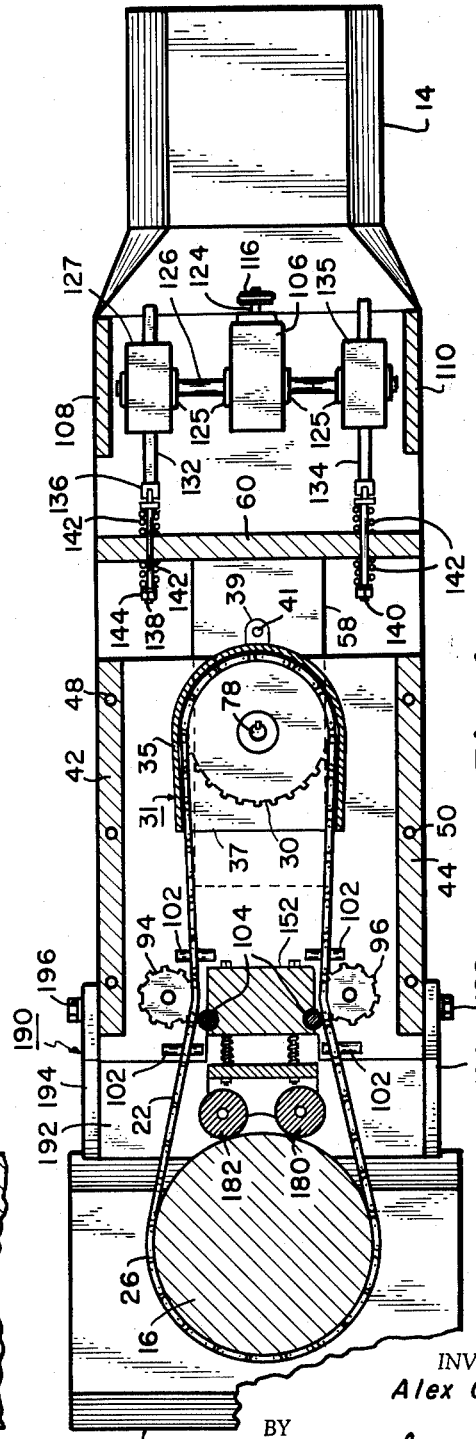
Fig. 3
Fig. 4
INVENTOR.
Alex Gilbert

April 26, 1966  A. GILBERT  3,247,700
FORGING MANIPULATOR

Filed July 11, 1963  4 Sheets-Sheet 3

INVENTOR.
Alex Gilbert
BY Webb, Mackey & Burden
HIS ATTORNEYS

United States Patent Office 3,247,700
Patented Apr. 26, 1966

3,247,700
FORGING MANIPULATOR
Alex Gilbert, R.D. 3, Horseshoe Drive, Latrobe, Pa.
Filed July 11, 1963, Ser. No. 294,303
10 Claims. (Cl. 72—420)

This invention relates in particular to a new and novel apparatus for effecting improved manipulation of work pieces during forging.

In the forging of metals, work pieces are mechanically deformed by repeated blows by hammer or by intermittent pressing under high pressures. The metal parts or work pieces being forged are seated on the die block or table of the forging hammer or press and the hammer or top die is brought down vertically to either press the metal into the desired shape, or to repeatedly hammer the work pieces into the desired configuration.

Except where shaped dies are employed to create a specific shape to the forging, the work piece is conventionally rotated and moved or manipulated about the bottom die block between the blows of the hammer or between intermittent pressings. Such rotation and manipulation is required to achieve the desired shape.

When forging relatively small articles, or when small work pieces are forged, the piece is rotated and positioned on the die block during forging by workmen who manually handle the forgings wtih appropriate tongs. When the work piece is large, mechanical means must be employed to appropriately manipulate the work piece during forging.

To accomplish manipulation of work pieces that are too large to be handled manually, it is conventional practice to employ a machine called a manipulator. Presently available apparatus for manipulating such work pieces consist essentially of a conventional high lift machine upon which there is mounted mechanically operable claws with which work pieces may be gripped and lifted onto the forging die. Such apparatus is capable of holding the work piece and positioning it on the die, but cannot rotate such a work piece with any appreciable degree of accuracy.

I have devised a machine which may be horizontally positioned to hold the work piece and which may be employed to cause the work piece to rotate in a horizontal plane in a highly accurate and controllable manner. My apparatus is provided with a handle disposed to be gripped by the claws or tongs of the above described conventional manipulator or other suitable device so that the work piece may be appropriately positioned on the die block of the forging apparatus. The conventional manipulator may then be employed to position the work piece on the die block during forging and such work piece may be appropriately rotated by my apparatus so that appropriate manipulation may be accomplished in a much more desirable and efficient manner than has heretofore been possible.

In my apparatus, an endless drive chain is mounted on a frame so that a free loop of the chain extends beyond the end of the frame. The free loop of the drive chain is disposed to be looped about a work piece and drawn up tightly. The work piece is caused to abut a resilient retaining member designed to maintain appropriate tautness in the chain passing around the work piece and absorb the shock and vibrations of forging. The drive chain may then be rotated in either direction as desired so that the work piece will be appropriately rotated by the drive chain that is looped about its exterior surface.

In the preferred embodiment of my invention, the endless drive chain passes around and is driven by a horizontally mounted drive sprocket. The horizontally mounted sprocket is mounted on a shaft that is supported between the arms of a U-shaped platform. The U-shaped platform is positioned on its side and guide slots are provided on the frame which cooperate with the extending arms of the U-shaped platform so that the platform and the horizontally mounted sprocket positioned on the shaft extending between the arms of said U-shaped platform may be slid along the frame towards and away from the work piece and, consequently, the slack of the free loop may be appropriately adjusted by horizontally positioning the sprocket wheel. An appropriate motor and gearing apparatus is mounted on the frame that holds the U-shaped platform and is connected to such platform and drives such platform along the frame in either direction as desired. Accordingly, the platform may be driven towards the work piece to provide slack in the drive chain loop or away from the work piece to draw the chain tightly about the work piece. A second motor and gearing apparatus is mounted on the slide platform and is disposed to drive the shaft upon which the drive sprocket is mounted so that when a work piece is drawn tightly within the free loop, it may be rotated by causing the drive sprocket to rotate by the aforesaid appropriate motor and gearing apparatus.

The preferred resilient member against which the work piece is abutted by drawing the drive chain tightly about the work piece and which maintains a predetermined tension on the drive chain consists of two rotatably mounted rollers which are vertically positioned between the extending arms of a yoke member which, in turn, is connected to sliding bolts or sliding shafts which are disposed to slide inwardly and outwardly within appropriate recessions formed in a mounting block attached to said frame. Spring elements surround such slide shafts or bolts and bear on the yoke member and the mounting block so as to urge the vertically mounted rollers towards the work piece and such rollers are disposed to hold the work piece when it is drawn tightly by the drive chain, and the spring elements continue to hold the work piece tightly against the drive chain at a predetermined tension determined by the resiliency of the spring elements so that the work piece may be appropriately rotated when desired.

In my preferred embodiment, a handle member extends rearwardly of the frame opposing that portion of the apparatus disposed to hold the work piece and such handle is formed in such a manner as to be easily gripped by a mechanical manipulator or other appropriate device, and elevated and handled in a substantially horizontal manner so that the work piece may be appropriately manipulated on the die block during the forging operation.

It is, accordingly, the object of the present invention to provide an apparatus which is capable of holding and rotating a forging work piece and which may be elevated by conventional apparatus so that the work piece can be positioned upon the die block of a forging press and appropriately manipulated during forging.

Other objects and advantageous features of the present invention will be obvious from the following description and the drawings wherein:

FIGURE 3 is a view partially in cross section and partially in elevation of the apparatus of FIGURES 1 and 2 as seen along the line III—III of FIGURE 2;

FIGURE 4 is a plan view partially in cross-section as seen along the line IV—IV of FIGURE 1;

Figure 1:
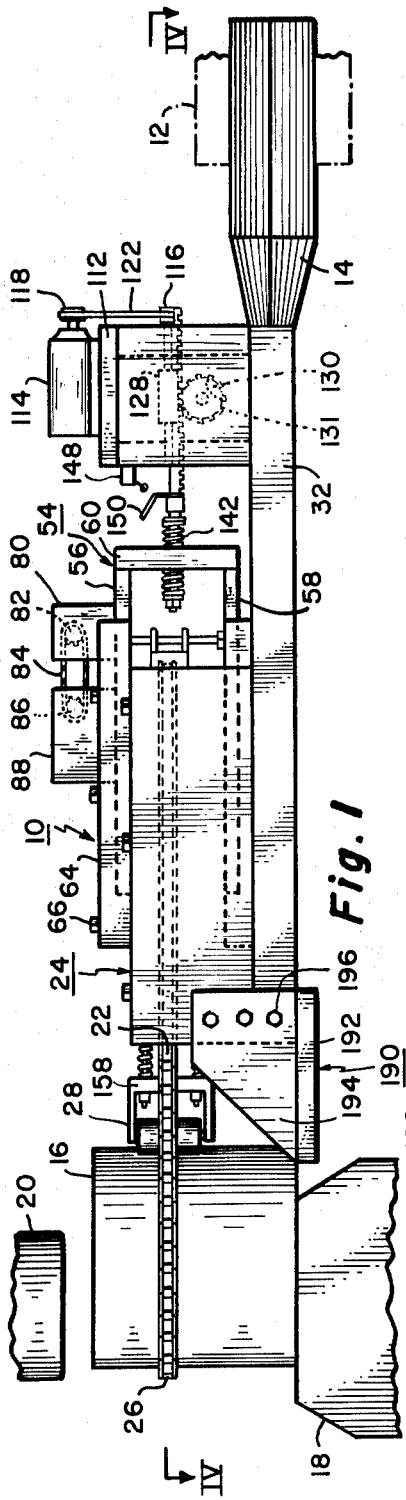
FIGURE 1 is a side elevation view of an apparatus embodying features of the present invention shown as holding a work piece on the die block of a forging machine.

As may be seen by FIGURE 1, the apparatus of the present invention, shown generally at 10, is disposed to be positioned horizontally by means of an appropriate mechanical manipulator (not shown) whose gripping jaws or tongs, represented generally in FIGURE 1 at 12, grip the handle 14 of the apparatus of FIGURE 1 while the apparatus 10 holds the work piece 16 that is to be forged while it is positioned on the die block 18 (only a fragmentary portion of which is shown) of a conventional forging apparatus. The view of FIGURE 1 also shows a fragmentary portion of the top die or hammer portion 20 of the forging apparatus disposed vertically above die block 18 and work piece 16. It will be appreciated that hammer or top die 20 will be vertically lowered so as to contact work piece 16 and mechanically reduce or flatten work piece 16 as is the aim of such a forging operation. It will be further appreciated that since the work piece 16 possesses a greater surface area than hammer or die 20, the work piece 16 must be appropriately manipulated on the die block 18 during intermittent blows of the hammer 20, or in the case of press forming during intermittent pressing operations by the member 20. If the work piece 16 is to be uniformly reduced in its vertical dimension, such manipulation is most conveniently accomplished by appropriate rotation of the work piece 16 as the hammer or die 20 is intermittently brought to bear on the top surface of work piece 16.

In the embodiment of the present drawings, a drive chain 22 is mounted to a frame 24 and extends forwardly so as to form a loop 26 which is disposed to be looped about the work piece 16. Means are provided, as will be described in greater detail herebelow, within the frame 24 to draw the drive chain 22 tightly around the work piece 16 so that the work piece 16 is drawn towards the apparatus 10. Work piece 16 contacts a resilient stop member 28 so that the tightness or tautness of drive chain 22 around work piece 16 is determined by the resiliency of stop member 28. It will be appreciated that such resilient mounting is significant since some ability to yield between the chain 22 and work piece 16 is necessary since as the forging operation proceeds, hammer or die member 20 will cause work piece 16 to flatten and its circumferential area to expand. Also, such mounting must be able to absorb shock and vibration imposed by the forging operation.

There is also mounted within the frame 24 means for driving drive chain 22 in either direction and since the chain 22 is held tautly about the circumference of work piece 16 when it is caused to rotate, work piece 16 appropriately revolves.

Frame 24 is shown to be mounted on a base plate 32 to which handle 14 is a part. Base plate 32 is appropriately elongated to accommodate the present apparatus. The frame 24 is formed of supporting bars 34 and 36 which are rigidly attached, as by welding, to base plate 32 and which extend longitudinally near either edge on the top surface of the base plate 32 (see in particular FIGURE 7). Spaced top and bottom horizontally disposed plates 38 and 40 and vertically positioned side plates 42 and 44 are bolted together by means of appropriate threaded perforations and elongated bolts as shown at 48 and 50 (see in particular FIGURE 7) to form the rectangular housing 52 of frame 24.

An elongated U-shaped platform 54 (see in particular FIGURE 3) positioned on its side is formed of two horizontally positioned plates 56 and 58 and a back plate 60 which extends transversely beyond the width of the legs 56 and 58 of the U-shaped platform 54 (FIGURE 4). The upper leg or plate 56 of U-shaped platform 54 is shown to bear upon the top plate 38 of the rectangular housing 52 of frame 24 and the bottom leg or plate 58 of U-shaped platform 54 projects beneath the bottom plate 40 of the housing 52 of frame 24. Elongated L-shaped guide members 62 and 64 are bolted to the top surface of plate 38 as shown at 66 (FIGURES 5 and 7) and are positioned to receive the plate 56 therebetween. Similar elongated L-shaped guide members 68 and 70 are positioned beneath the bottom plate 40 of the housing 52 and are appropriately attached to the base plate 32, as by welding. L-shaped guide members 68 and 70 are appropriately positioned to receive the bottom leg or plate 58 of the U-shaped platform 54 therebetween so as to retain and guide such member. Additionally, bushings such as shown at 72 are provided between the L-shaped guide members 68 and 70 and the plate 58 of U-shaped platform 54, such bushings providing surfaces on which plate 58 may appropriately slide.

It may be observed that the U-shaped platform 54 may slide inwardly or towards loop 26 and work piece 16 or outwardly and away from such members while its upper and lower legs, or plates 58 and 60, slide within the guide areas provided by the appropriately positioned L-shaped guide members 62, 64, 68 and 70.

Figure 7:
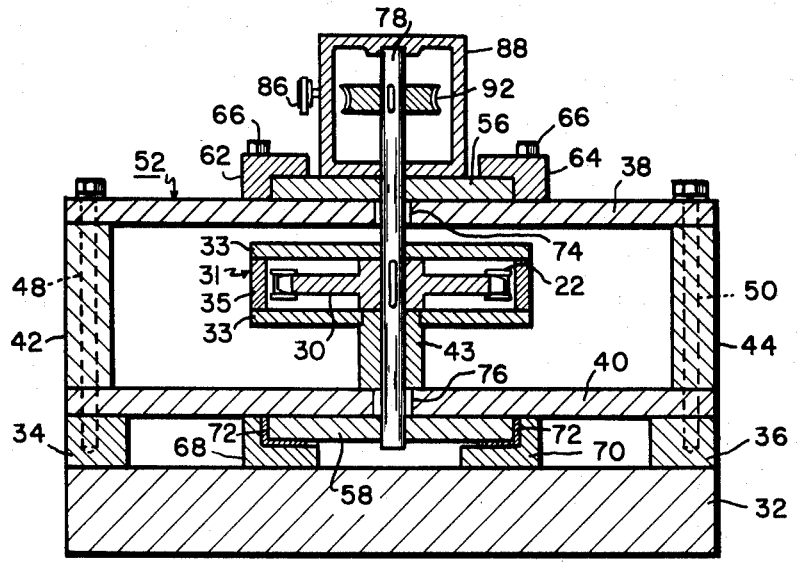
FIGURE 7 is a cross-sectional view of the apparatus of FIGURES 1 and 2 as seen along the line VII—VII of FIGURE 2.

There is formed within the plates 38 and 40 of housing 52 substantially in-line centrally positioned longitudinally elongated slots 74 and 76 (see in particular FIGURES 3 and 7). A drive shaft 78 projects between the upper and lower arms of the U-shaped platform 54 or plates 56 and 58 and is rotatably mounted within suitable openings formed within these members and, additionally, projects through appropriately positioned slots 74 and 76.

There is also mounted on the top leg or plate 56 of the U-shaped member 54 an appropriate drive motor 80 that is provided with a conventional clutch apparatus (not shown) that is disposed to drive a sprocket 82 in one of two directions, such sprocket effecting drive motion to a drive chain 84, which is looped about and drives another sprocket 86 that extends from a housing 88, which is also mounted on the top leg or plate 56 of U-shaped platform 54.

The sprocket 86 that extends from housing 88 is non-rotatively attached to and consequently drives a shaft and worm 90 which, in turn, transmits rotative motion to an appropriate worm wheel 92 which is non-rotatably attached to drive shaft 78 so that when the motor 80 transmits rotative motion from sprocket 82 to sprocket 86 via drive chain 84, the shaft 78 will be caused to rotate.

Figure 5:
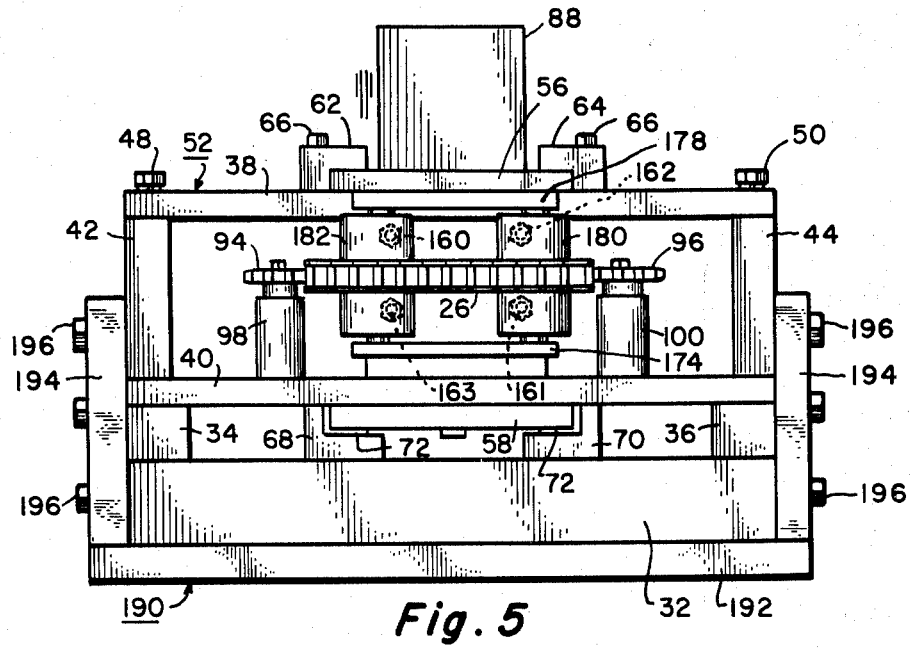
FIGURE 5 is an end elevation view of the apparatus of FIGURES 1 and 2 as seen along the line V—V of FIGURE 2, but with the work piece 16 being omitted.

A horizontally positioned sprocket wheel 30 is non-rotatably attached to drive shaft 78 within the housing 52 of frame 24. As shown, particularly in FIGURE 4, drive chain 22 extends from loop 26 into the housing 52 of the frame 24 and is looped about sprocket wheel 30. As the drive chain 22 projects within the opening of housing 52, it encounters and passes around idler sprocket wheels 94 and 96. Idler sprocket wheels 94 and 96 are appropriately rotatably mounted to bottom plate 40 of housing 52 on mounting members 98 and 100 (FIGURE 5). Drive chain 22 is also supported vertically as it enters housing 52 by means of transversely mounted rollers such as shown at 102 which are appropriately rotatably mounted to the top surface of bottom plate 40 within housing 52 and chain 22 is additionally urged against idler sprocket wheels 94 and 96 by vertically positioned rollers such as shown at 104 (FIGURE 4) that are appropriately rotatably positioned between bottom plate 40 and top plate 38 of the housing 52 within grooves formed in block 152.

Thus, it may be observed that when the U-shaped platform 54 is appropriately positioned along the L-shaped slide members 62, 64, 68 and 70 so as to bring drive chain 22 tautly about the work piece 16, appropriate energization of motor 80 which, as explained above, causes the shaft 78 to rotate and causes sprocket wheel 30 to rotate and the drive chain 22 to appropriately rotate about the idler sprocket wheels 94 and 96 and the appropriately mounted supporting and guide rolls 102 and 104, rotation of work piece 16 is effected.

U-shaped platform 54 may be horizontally positioned along base plate 32 and frame 24 since the plates 56 and 58 are slideably movable in the manner heretofore described and the shaft 78 projects between appropriately positioned slots 74 and 76 formed in the top and bottom plates 38 and 40 of the housing 52. It will be noted that the U-shaped platform 54 may slide along the guides 62, 64, 68 and 70 horizontally towards and away from work piece 16 that amount or distance permitted by slots 74 and 76. Obviously, such slots are designed to accommodate the degree of sliding motion desired.

Sprocket wheel 30 is shown to be encased in a housing 31 (FIGURES 3, 4 and 7) that consists of horizontal side plates 33 positioned on either side of sprocket wheel 30 and a vertically enclosing wall 35. Plates 33 are formed with appropriate openings through which the drive shaft 78 projects.

The housing 31 is formed with an open end 37 and is positioned within housing 52 of frame 24 so that open end 37 faces the loop 26 of drive chain 22 and appropriately accommodates both strands of chain 22 as it passes through housing 31 around the sprocket wheel 30. It will be noted that the plates 33 and thus housing 31 is semi-circular in shape at its end opposing open end 37 and that vertical side wall 35 encloses the semi-circular circumference at this end.

Housing 31 is attached to plates 56 and 58 of platform 54 by means of tabs 39 that are rigidly attached to housing 31 and which extend horizontally from the semi-circular end of housing 31 outwardly from between the plates 38 and 40 of housing 52. A pin 41 is rigidly attached at either end to plates 56 and 58 of platform 54 so as to span the distance between the legs of U-shaped platform 54, exterior of housing 52, and projects through appropriate perforations within the tabs 39.

The housing 31 and sprocket wheel 30 are provided with vertical support by means of a slide sleeve 43 upon which they are shown to be seated (FIGURE 3). Slide sleeve 43 is projected over the drive shaft 78 and is seated on plate 40 of housing 52 so as to straddle slot 76. Consequently, it may be observed that housing 31 is mounted to platform 54 and will slide with platform 54 so as to maintain its position around sprocket wheel 30. Sleeve 43 slides along the surface of plate 40.

Housing 31 acts as a guide and retaining member for drive chain 22 and holds chain 22 into engagement with the teeth of sprocket wheel 30 even though platform 54 has been advanced towards loop 26 so as to create slack in the drive chain 22 and disengaged work piece 16.

Mounted rearwardly of the frame 24 and U-shaped platform 54 on the plate 32 is a housing 106. Housing 106 and its associated apparatus is provided with a guard or retaining housing consisting of side plates 108 and 110 extending vertically of and seated upon plate 32 near either edge thereof adjacent housing 106 and having a horizontal top plate 112 extending therebetween.

Figure 2:
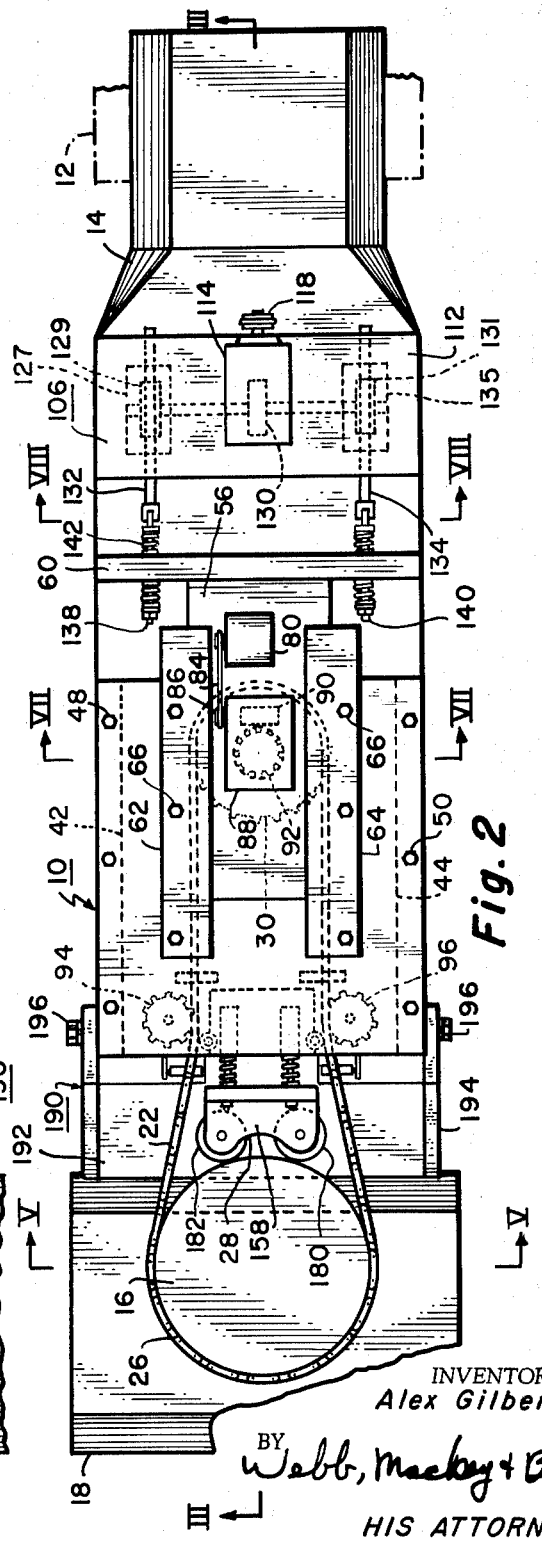
FIGURE 2 is a top plan view of the apparatus of FIGURE 1.

A motor 114 is appropriately mounted on plate 112 and is disposed to drive a sprocket wheel 116 by means of sprocket wheel 118 attached to the drive shaft 120 of motor 114 which, in turn, drives a drive chain 122 which is appropriately looped about the sprocket wheels 118 and 116. Sprocket wheel 116 causes a drive shaft 124 that is appropriately rotatably mounted within the housing 106 to rotate so that a transversely positioned drive shaft 126 is caused to be driven through worm 128 and worm wheel 130 of a worm gear drive. Rotation of shaft 126 effects appropriate rotation of pinion gears 129 and 131 (shown in dotted outline in FIGURES 2 and 8). Pinion gears 129 and 131 are disposed to drive appropriate toothed racks 132 and 134. Toothed racks 132 and 134 are appropriately attached to back plate 60 of the U-shaped member 54 by being hinged as shown at 136 to slide bolts 138 and 140.

Figure 8:
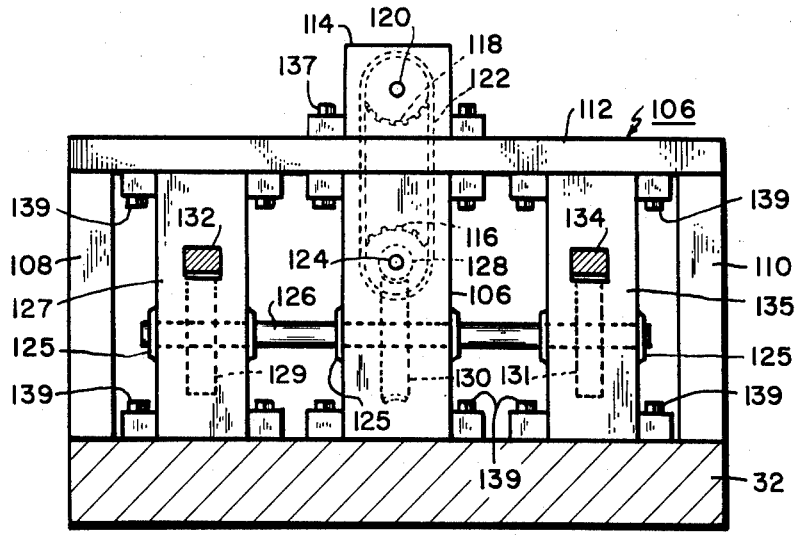
FIGURE 8 is a view partially in cross-section and partially in elevation of the apparatus of FIGURES 1 and 2 as seen along the line VIII—VIII of FIGURE 2.

In the present embodiment transverse drive shaft 126 projects through bearing housings 125 which are in turn supported by vertical support members 127 and 135 and housing 106 which extend between plates 32 and 112 (see FIGURE 8). Housing 106 also provides supporting means for shaft 124, sprocket wheel 116 and worm 128. Worm wheel 130 and gears 129 and 131 are, of course, supported by the shaft 126. Toothed racks 132 and 134 project forwardly (towards platform 54) through appropriate openings within vertical support members 127 and 135.

Motor 114 is shown to be attached to plate 112 by means of rigidly attached flange members and bolts as shown at 137 in FIGURE 8. Vertical support members 127 and 135 and housing 106 are also attached to plates 112 and 32 by means of bolted flanges as shown at 139 (FIGURE 8).

Slide bolts 138 and 140, project through appropriate perforations formed within the plate 60. Slide bolts 138 and 140 are disposed to slide within said perforations and are resiliently mounted to plate 60 by means of spring elements as shown at 142. Spring elements 142 surround the slide bolts 138 and 140 on either side of plate 60, bear on plate 60, at one end, and retaining nuts, such as shown at 144, at the other end. Retaining nuts 144 are threadably engaged with the threaded ends of slide blots 138.

Thus, it may be seen that energization of motor 114 causes rotation of shaft 120 and, through a worm gear connection consisting of worm 128 and worm wheel 130, such rotative motion is transmitted to the shaft 126 which, in turn, causes rotation of pinion gears 129 and 131 which causes U-shaped platform 54 to be driven along its guides in a horizontal manner so as to draw chain 22 tautly against work piece 16. The resilient connection between the racks 132 and 134 and plate 60 effected by spring elements 142, prevent breakage of chain 22 due to shock vibration during forging.

As an additional safety factor, a microswitch and microswitch trip plates 148 and 150, respectively, are appropriately mounted so that should U-shaped platform 54 be retracted beyond a predetermined limit, motor 114 will be deenergized by the activation of microswitch 148 caused by the trip plate 150 contacting microswitch 148 (FIGURE 3).

It will be appreciated that motor 114 will be provided with a clutch drive (not shown) disposed to effect rotative motion to drive shaft 120 and, hence, ultimately drive shaft 126, so that the pinion gears 129 and 131 may be driven in either direction. In this manner, U-shaped platform 54 may be driven either towards or away from work piece 16 and the loop 26 may be appropriately expanded or contracted in accordance with the need or use of the apparatus 10.

Figure 6:
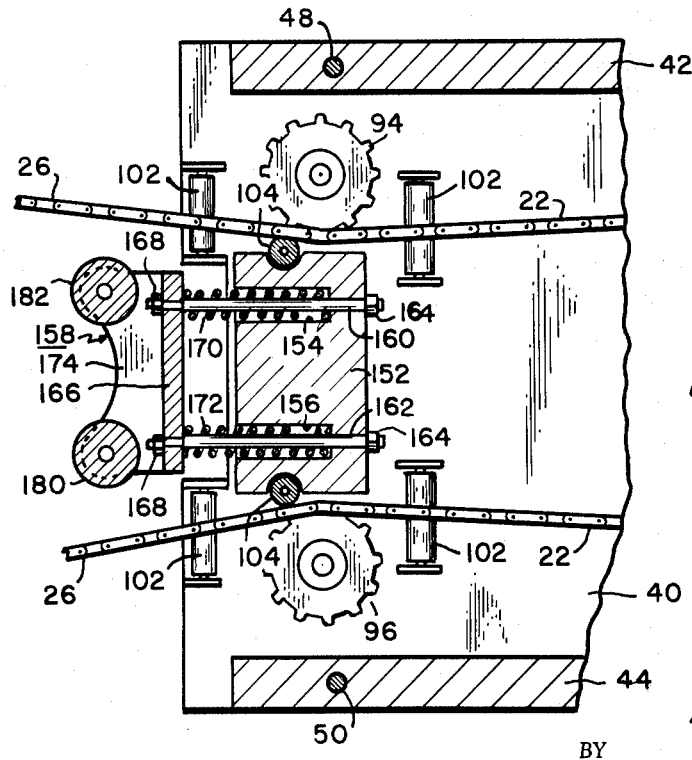
FIGURE 6 is an enlarged framentary plan view partially in cross-section of the end portion of the device of FIGURES 1 and 2 showing in particular the resilient mounting of the rollers disposed to restrain the work piece.

There is shown to be mounted in the forward portion of housing 52 of the frame 24, a block 152. Block 152 is rigidly mounted to the forward portion or edge between plates 38 and 40 of the housing 52. The block 152 is provided with appropriate recessed areas 154 and 156 (see in particular FIGURE 6). A yoke member 158 is appropriately mounted to slide bolts 160 and 162 which project through the recessions 154 and 156 and through appropriate perforations within the block 152 opening through the bottom of recessions 154 and 156, respectively, so that the slide bolts 160 and 162 slide entirely through the block 152. Slide bolts 160 and 162 are threaded at their ends and are appropriately provided with stop nuts 164 that prevent their being withdrawn from the block 152. Slide bolts 160 and 162 also project through appropriate perforations formed within the back plate 166 of the yoke 158 and are appropriately held to this member by means of the stop nuts 168. Spring elements 170 and 172 surround slide bolts 160 and 162 and project into the recessions 154 and 156. Spring elements 170 and 172 bear on block 152 at the bottom of their respective recessions 154 and 156 and also on plate 166 of yoke 158 so that the yoke 158 is resiliently connected to the block 152 by means of spring elements 170 and 172 and slide bolts 160 and 162 which are disposed to slide within appropriate perforations formed in block 152 and yoke 158.

A second set of slide bolts 161 and 163 are similarly resiliently mounted to block 152 and yoke 158 in line with and below bolts 160 and 162.

There is rotatably mounted between the arms 174 and 178 of the yoke member 158 two rollers 180 and 182. Yoke 158 and consequently rollers 180 and 182 are positioned to bear upon work piece 16 when it is drawn tautly against the rollers 180 and 182 by the chain drive 22 being drawn tautly by appropriate energization of motor 114.

It may be observed that the chain 22 is resiliently brought tight against work piece 16 by means of two sets of spring elements consisting of spring elements 142 and, additionally, the spring elements 170 and 172, so that the shock and strain of hammer or die 20 striking or pressing work piece 16 will not adversely affect the drive chain 22 which, as shown above, may be rotated in either direction so as to properly position work piece 16 on die block 18.

There is attached to the end of plate 32 adjacent loop 26 or work piece 16, a tray 190 composed of an extending horizontally positioned bottom plate 192 that overlaps the bottom of plate 32 to some extent. Plate 192 of tray 190 is provided support by means of end flanges or tabs 194 which are appropriately attached to plate 192, as by welding, and which are bolted to plate 32, side bars 34 and 36 and plates 42 and 44 of frame 24 as shown at 196 (FIGURE 5).

The purpose of tray 190 is to provide support for the work piece 16 where such work piece is of such a size it extends beyond the die 18 of the press. It will be appreciated that where such a tray is not needed, it may be removed by detaching bolts 196.

It will be appreciated that the chain 22 and potential loop 26 may be appropriately enlarged or reduced by adding or taking away individual links in the chain.

It will also be appreciated that the embodiments of FIGURES 1 through 8 are illustrative only and that the present invention, including the following claims are not limited by the exact details set forth.

I claim:

1. An apparatus for horizontally rotating a work piece during forging comprising:
    (a) a frame;
    (b) an endless chain mounted on said frame and extended horizontally beyond said frame in a free loop, said loop being disposed to be looped around said work piece;
    (c) means for expanding and contracting said free loop;
    (d) means for resiliently holding said work piece taut against said chain when said loop is looped around said work piece, and
    (e) means for rotating said endless chain.

2. An apparatus for horizontally rotating a work piece during forging comprising:
    (a) a frame;
    (b) a sprocket wheel horizontally mounted to said frame;
    (c) an endless drive chain mounted to said sprocket wheel and extending beyond said frame in a free loop, said loop being disposed to be looped around said work piece;
    (d) means for moving said sprocket wheel horizontally on said frame towards and away from said free loop so as to expand and contract said free loop;
    (e) resilient means mounted to said frame and disposed to bear upon said work piece when drawn towards said frame by contraction of said free loop, and
    (f) means for rotating said sprocket wheel.

3. An apparatus as set forth in claim 2 wherein said sprocket wheel is horizontally mounted to a platform that is disposed to slide on tracks provided on said frame, said platform being disposed to slide horizontally on said frame towards and away from said free loop, so that said means (d) consist of means that drive said platform towards and away from said free loop.

4. An apparatus as set forth in claim 2 wherein said means (e) comprises vertically positioned rollers rotatably mounted between the extending arms of a yoke member, said yoke member being resiliently mounted to said frame and extending from said frame from between the strands of said chain.

5. An apparatus as set forth in claim 3 wherein said platform consists of a U-shaped member positioned on its side so that its open end faces said free loop, said sprocket wheel being horizontally mounted to a drive shaft extending between the arms of said U-shaped member and said means (f) consists of means mounted to said platform for rotating said drive shaft.

6. An apparatus for horizontally rotating a work piece during forging comprising:
    (a) a frame consisting of:
        (1) an elongated base plate, and
        (2) a rectangular shaped sleeve seated on said base plate with its central axis being positioned substantially lengthwise and one open end being adjacent one end of said base plate;
    (b) longitudinal guide members positioned on said frame above and below said sleeve disposed to receive the extending arms of a U-shaped platform;
    (c) said U-shaped platform positioned on its side with the extending arms projecting above and below said sleeve from the open end of said sleeve opposite said one end so that said U-shaped platform partially encompasses said sleeve;
    (d) a drive shaft projecting between the extending arms of said U-shaped platform through longitudinal slots formed in the top and bottom of said sleeve;
    (e) a horizontally positioned sprocket wheel non-rotatably mounted to said drive shaft and positioned between the extending arms of said platform;
    (f) an endless drive chain mounted to said sprocket wheel and extending from said one end of said sleeve and forming a free loop, said loop being disposed to be looped around said work piece;
    (g) vertically positioned rollers rotatably mounted between the extending arms of a yoke member, said yoke member being resiliently attached to and extending from said one end of said plate substantially between the strands of said endless chain so that said rollers engage said work piece when said free loop is contracted;
    (h) means for causing said drive shaft to rotate, and
    (i) means for causing said platform to slide horizontally in cooperation with said guide members so as to vary the size of said free loop.

7. An apparatus according to claim 6 wherein idler guide sprocket wheels are positioned on said frame adjacent said one end and each strand of said endless chain is caused to pass around said idler sprocket wheels as it enters or leaves said sleeve.

8. An apparatus according to claim 6 wherein a semicircular guide channel is positioned around the circumference of said sprocket wheel facing away from said one end of said sleeve, said guide channel being disposed to maintain engagement of said drive chain with said sprocket wheel when said chain is slack, said guide channel being attached so as to slide with said platform.

9. An apparatus according to claim 6 wherein said means (i) consists of a motor and gearing apparatus mounted on said plate on the side of said platform away from said one end, said motor and gearing apparatus being disposed to drive longitudinally positioned elongated members that are resiliently attached to the cross bar of said U-shaped platform in either longitudinal direction so as to cause said platform to slide longitudinally in cooperation with said guide members.

10. An apparatus according to claim 6 wherein said means (h) consists of a motor and gearing apparatus mounted on said platform disposed to cause said drive shaft to rotate.

References Cited by the Examiner
UNITED STATES PATENTS

| | | | |
|---|---|---|---|
| 381,474 | 4/1888 | Johnson | 78—96 |
| 752,218 | 2/1904 | Galloway | 78—98 |
| 1,472,977 | 11/1923 | Halliwell | 78—98 |

FOREIGN PATENTS

| | | |
|---|---|---|
| 15,607 | 10/1888 | Great Britain. |
| 163,788 | 5/1921 | Great Britain. |

CHARLES W. LANHAM, *Primary Examiner.*